Sept. 16, 1958 J. McELGIN ET AL 2,852,235
HEATING AND VENTILATING UNIT
Original Filed April 21, 1955 2 Sheets-Sheet 1
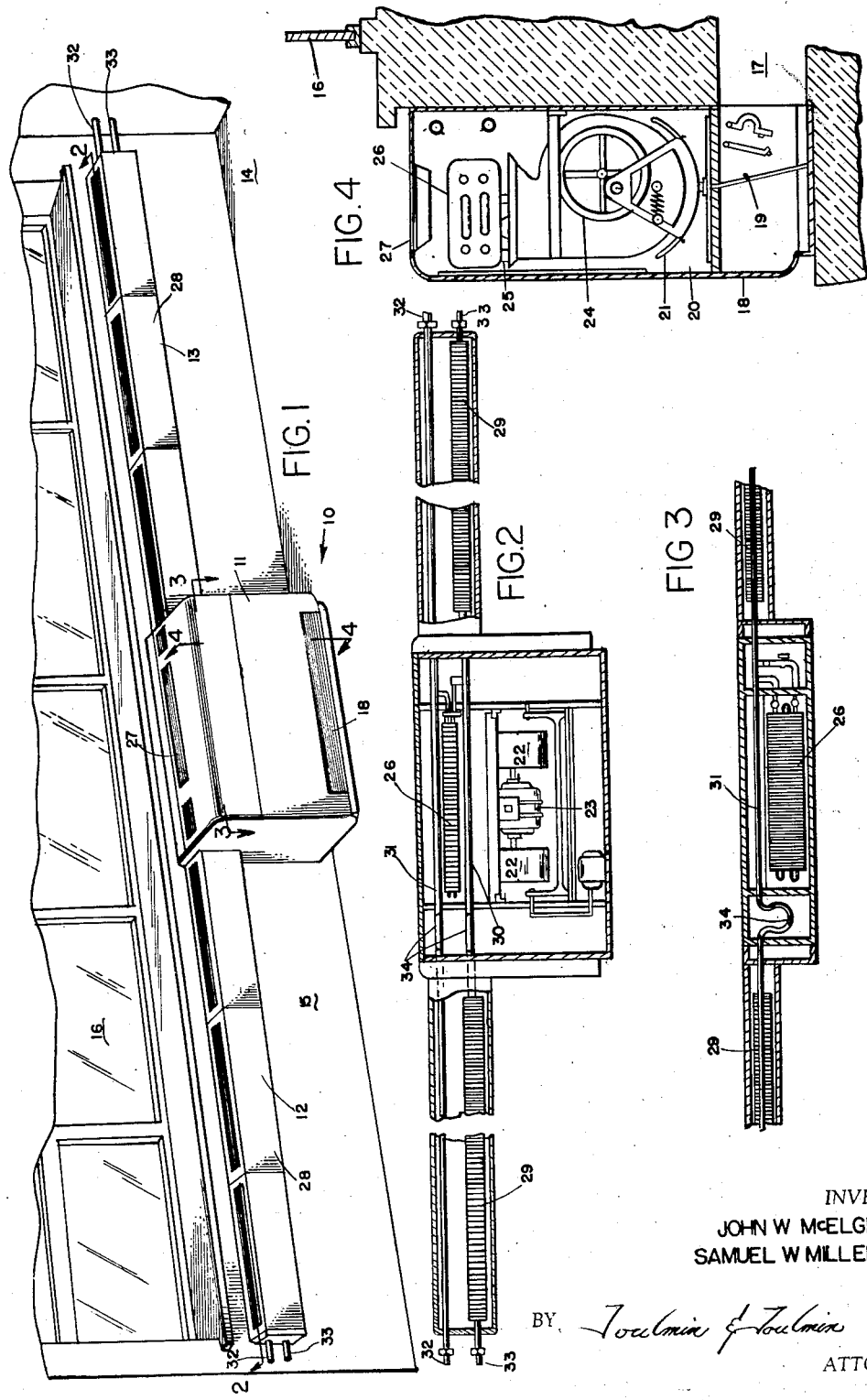
INVENTORS
JOHN W. McELGIN
SAMUEL W. MILLER JR
BY
ATTORNEYS

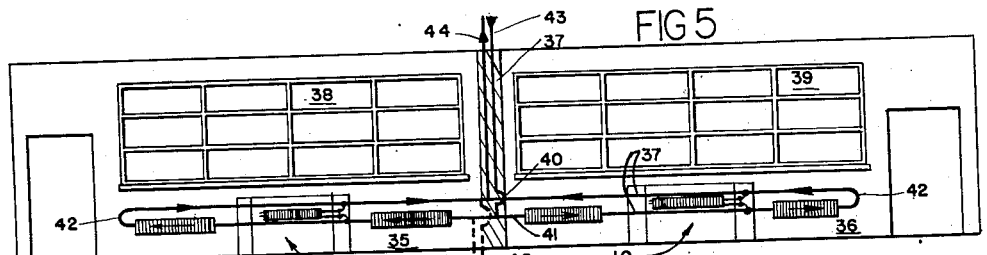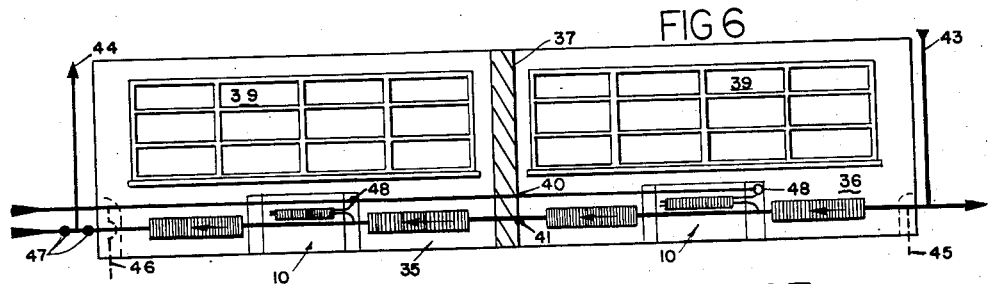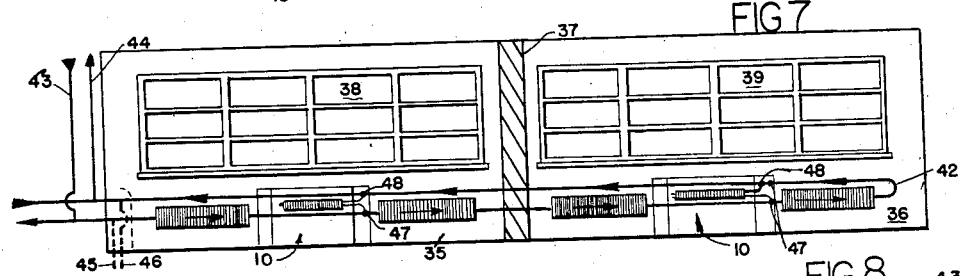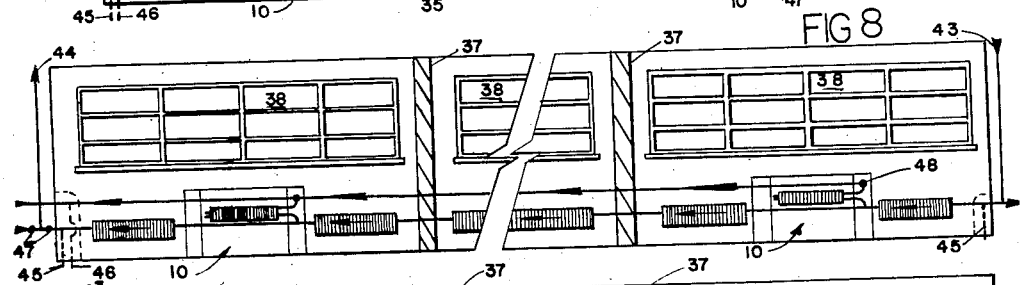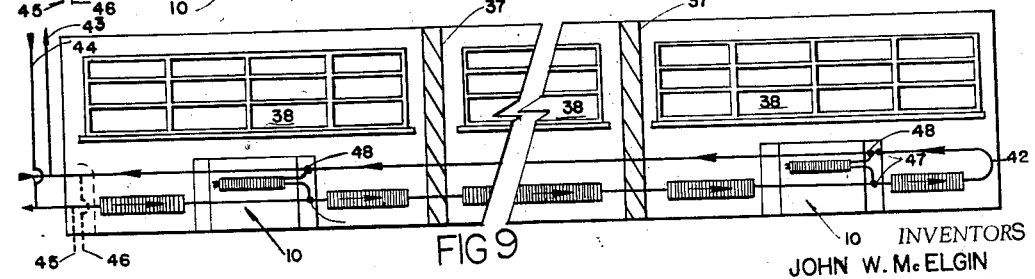

2,852,235

United States Patent Office
Patented Sept. 16, 1958

2,852,235
HEATING AND VENTILATING UNIT

John McElgin and Samuel W. Miller, Jr., Holmesburg, Pa.

Original application April 21, 1955, Serial No. 502,832. Divided and this application November 30, 1955, Serial No. 554,908

2 Claims. (Cl. 257—137)

This application is a division of applicants' earlier application No. 502,832 filed under date of April 21, 1955.

The present invention relates to heating and air-conditioning, more particularly to multi-room arrangements of heating and ventilating units especially adapted for combatting window down drafts.

To date numerous heatng and ventilating systems have been devised for multi-room applications. These multi-room applications are primarily for class-rooms wherein a considerable area of the outside wall of the room is occupied by a window. Other examples of multi-room applications are in offices, and in industrial plants where a large number of adjoining rooms have a common outside wall.

The conventional practice in the past has been to install a suitable heating and ventilating unit in each of the rooms. A separate set of supply and return means was then installed for each of the room units. This introduced complicated and expensive piping arrangements.

The usual process for establishing comfortable room conditions comprises admitting outside air to the units and heating the air to a predetermined comfortable temperature. However, in modern classrooms and the like having large window areas, occupant comfort cannot be achieved merely by maintaining the inner portion of the room at an optimum temperature. Means must be provided to combat the two effects created by the large window itself. These effects are window down draft and radiant loss by the occupants to the cold window surfaces.

The window down draft results from room air being chilled at the window, flowing downwardly along the window and then subsequently flowing out into the room in a continuous stream. Consequently, the room air-conditioning unit should combat the window down draft in addition to continually furnishing fresh comfortable air into the room.

There is presently a trend towards the use of forced hot water for heating and ventilating systems for schools and similar type applications. This trend is essentially based upon several advantages inherent in hot water systems. For example, the temperature of the water can be readily automatically varied with the outdoor temperature. This results in improved room temperature control than that which can be obtained using a constant temperature heating medium.

Another advantage is that the supply and return main piping is more flexible. The piping system is not bound by the condition of returning condensate to a boiler as is the case with steam.

Furthermore, the hot water piping for the same heat carrying capacity is considerably smaller than steam piping.

Utilizing the above characterisics of the forced hot water system, a wholly new approach to the heating of classrooms is possible.

The present invention discloses an air-conditioning system for installation in a single room together with various circuits into which these systems can be connected for multi-room installations.

The air-conditioning system of this invention essentially comprises a main heating and ventilating unit having auxiliary convector units extending laterally therefrom. The heating elements in the main and convector units are interconnected to enable hot water to flow through all or part of the convector and main units.

The convector units are positioned beneath the sills of the window. A sheet of warm air is directed upwardly from the convector units against the window. This sheet of heated air combats the window down draft by mixing with it, warming it, and diverting it upwardly over the occupants' heads. The main heating and ventilating unit admits outside air and circulates this air throughout the room at an optimum temperature.

Since hot water can flow through the convector and main units this makes possible a grouping of multi-unit systems in entire wings of buildings into circuits wherein the air conditioning systems themselves contain the supply and return piping required. Consequently, the conventional mains extending to each of the room air-conditioning systems are eliminated.

Since each air-conditioning system comprises supply and return piping therein, these units provide complete flexibility in multi-room application. By taking full advantage of the adaptability and virtual lack of restriction on the placement of the piping inherent in the forced hot water system, these air-conditioning systems can be integrated into a series system which results in maximum protection against window down draft with a piping circuit which provides simplicity and economy of installation.

Therefore, the principal object of this invention is to provide an improved arrangement for multi-room applications of heating and ventilating units.

It is another object of this invention to provide multi-room installations for heating and ventilating units where the conventional mains to each unit are eliminated.

It is a further object of this invention to provide multi-room installations for heating and ventilating units wherein the units function as the supply and return lines.

It is an additional object of this invention to provide piping circuits for multi-room installations of heating and ventilating units which result in simplicity and economy of installation.

It is still another object of this invention to provide a forced hot water heating and ventilating unit containing supply and return piping therein.

It is a still further object of this invention to provide a multi-room forced hot water heating system characterized by extreme flexibility of arrangements into various circuits.

Other objects and advantages of this invention will become apparent upon reference to the accompanying description when taken in conjunction with the following drawings; wherein:

Figure 1 is an overall perspective view of the air-conditioning system of this invention;

Figure 2 is a sectional view taken along the lines 2—2 of Figure 1;

Figure 3 is a sectional view taken along the lines 3—3 of Figure 1;

Figure 4 is a sectional view taken along the lines 4—4 of Figure 1;

Figures 5 through 7 are schematic views illustrating circuit connections between air-conditioning systems for two class room applications;

Figures 8 and 9 are schematic views illustrating circuit connections between air-conditioning systems for multi-class room applications.

Proceeding now to the drawings, particularly to Figure 1, wherein like reference symbols indicate the same parts on the various views, 10 indicates generally a room air-conditioning system disclosed as this invention. The air-conditioning system 10 comprises a main heating and ventilating unit 11 and having convector units 12 and 13 extending laterally from each end of the main unit.

The system 10 is installed in a room 14 against an outside wall 15 having a window 16 therein. The window 16 occupies a considerable portion of the area of the outside wall 15. The air-conditioning system 10 is mounted beneath the window sill and extends the length of the window.

The main heating and ventilating unit 11 is illustrated in Figures 2 through 4, and comprises an outdoor inlet 17 and an indoor inlet 18, both of which are separated by a partition 19 to enable both inlets to communicate with a chamber 20. The degree of communication of each inlet with the chamber 20 is controlled by the setting of a roll damper 21 which can be positioned to close off either inlet completely. In its intermediate position the damper admits predetermined proportions of indoor and outdoor air into the chamber 20.

A pair of blowers 22 powered by a motor 23 located therebetween are positioned within the chamber 20. The chamber 20 communicates with the blowers 22 through inlets 24. The blowers discharge the air upwardly into a chamber 25 in which is located a main heating element 26. The heating elements 26 are of the multi-pass type and comprise finned tubing.

After the air passes through the heating element 26, it is discharged outwardly into the room through a discharge opening 27 located in the top of the unit.

The convector units 12 and 13 each comprises a casing 28 having top and bottom openings therein. There is a heating element 29 in each of the convector units. The convector heating elements are of the single pass type and comprise copper tubing having a plurality of heating fins thereon.

The convector heating elements 29 are connected serially by means of a conduit 30. Located above the conduit 30 and passing through both convector units and the main unit is a return line 31. The return line has connections 32 extending beyond the outer ends of each of the convector units. Similarly the convector heating elements have supply connections 33 also extending beyond the outer ends of the convector units.

The main unit heating element 26 is connected across the conduit 30 and the return line 31.

There are expansion loops 34 in both the supply and return lines 30 and 31. These expansion loops are located in the left hand piping compartment of the main unit 11. The loops permit expansion of the convector heating elements when the air-conditioning system is employed in multi-room applications.

With the above described structure of the air-conditioning system in mind, the various applications of this air-conditioning system in multi-room installations will be presently described. The various circuits into which the air-conditioning systems may be connected for both two-room and multi-room applications will be indicated. In addition, schematic piping diagrams of the several multi-room applications will also be described in order to illustrate the simplicity of the piping arrangement.

In each application a suitable temperature regulation system is provided to progressively increase the hot water temperature as the outside temperature falls. This will greatly increase the protection against the effects of window down draft and the cold surface directly to their intensity.

In Figure 5 there is illustrated a two-room application of the air-conditioning system of this invention. Rooms indicated at 35 and 36 are divided by a partition 37. There are windows 38 and 39 in each of the rooms. The air-conditioning system 10 is installed in each one of the rooms 35 and 36 beneath the respective windows. There are connections 40 and 41 between the return and supply lines of each of the systems. These connections 40 and 41 pass through the partition 37. The outer ends of supply and return lines of each of the air-conditioning systems are connected, as indicated at 42.

This application is suitable for use in either up-feed or down-feed systems. Since the two units are in parallel either a direct or reverse return may be employed. The terms "up-feed" and "down-feed" refer to the locations of the mains with respect to the units being serviced.

In the direct return system, both the supply and return piping follow the shortest route from the boiler and pump to the air-conditioning system being served. Because of the differences in head loss to the pumping, the available head at the system nearest the pump is higher than that at the farthest unit. Because of the difference in pressure available at each system, manually adjusted balancing valves are employed to equalize the flow rates.

In the reverse return system, the supply line takes the most direct route from the boiler and pump to the systems being served, but the return line is run parallel with the supply line to the most remote unit and then back to the pump and boiler. The reverse return systems provide a balanced piping system. Consequently, there is no need to equalize head losses in the piping. The piping in this system, however, is generally more complex than in a direct return system.

Down-feed supply and return run-outs 43 and 44 are concealed in the partition 37. Up-feed supply and return run-outs indicated at 45 and 46 may be extended upwardly also through the wall partition 37, or in a piping compartment located in the corner of one of the rooms.

If up-feed run-outs are employed, air vents must be provided for at each system serviced. As the mains are located below the system being served, air may be trapped in each unit. The vents accordingly will release the trapped air.

Expansion loops 34 are provided in the supply and return lines of one of the air-conditioning systems 10. If the systems are connected for a direct return piping arrangement, balancing valves indicated at 47 must be provided to regulate the flow of hot water between the convector heating elements and the main heating elements.

In Figure 6 there is illustrated a reverse return system wherein a series of air-conditioning systems serve two rooms by means of alternate supply and return run-outs located in the partition walls of every second class room. This arrangement is also suitable for use on either the up-feed or down-feed systems.

It is pointed out that while the supply run-out is connected to the air-conditioning supply connection 33, the return run-out is connected to both the return and supply lines at the connections 32 and 33. Balancing valves 47 are provided in the lower supply conduit on both sides of the return run-out connection thereto.

If desired, up-feed run-outs indicated at 45 and 46 may be employed. As indicated previously, if up-feed run-outs are used air vents 48 for each of the air-conditioning services must be installed.

The convector unit heating element between the last main heating and ventilating unit and the return connection is connected in parallel with the heating elements of the main unit. A balancing valve 47 is employed to regulate the amount of water passing through this convector unit.

Connections 49 and 50 are provided to connect the return and supply lines to adjacent similar systems.

Figure 7 illustrates a series connection between a plurality of air-conditioning systems 10 for use on up-feed or down-feed direct return systems. The hot water is supplied through supply and return run-outs located in the partition walls in every fourth room. Similarly, up-feed run-outs may be provided in the same partition or on a piping compartment located in the room.

In this arrangement the outer ends of supply and return lines of the extreme air-conditioning system 10 are connected, as indicated at 42. The convector heating element at the extreme end of the circuit farthest from the run-outs is connected across the heating elements of the main heating and ventilating units. A balancing valve 47 is employed to regulate the flow of water passing through this convector heating element.

Figure 8 shows a plurality of air-conditioning systems connected in series for either an up-feed or down-feed system employing a reverse return. This circuit is similar to the circuit described in Figure 6, but is shown as installed for a number of rooms greater than two.

It is pointed out that in this application a single run-out, either supply or return, serves two groups of rooms, one located at either side of the partition in which the run-out is located. Connections are provided to connect the circuit illustrated with similar adjacent circuits.

In Figure 9 there is illustrated a plurality of air-conditioning systems connected in series for use with up-feed or down-feed systems employing a direct return. This circuit is similar to the circuit illustrated in Figure 7 but illustrates the application of air-conditioning systems to a number of rooms greater than two.

It is pointed out that in this application one set of run-outs will serve two groups of class rooms, one located on either side of the partition in which the run-outs are carried.

Thus it can be seen that with the air-conditioning system of this invention and the various described series of connections of these air-conditioning systems, a great variety of arrangements may be achieved with extreme economy in piping. This economy of piping is attainable by means of employing air-conditioning systems having supply and return run-outs therein. As pointed out with the various multi-room applications the need for conventional mains to the various air-conditioning systems is eliminated. A group of air-conditioning systems are connected in series and it is only necessary to connect this series of air-conditioning systems with a greatly decreased number of run-outs.

Since many piping connections are eliminated at the site of installation, the time and cost of installing a heating and ventilating system as described in this invention is greatly reduced. In addition, these series of air-conditioning systems combine all the enumerated advantages of forced hot water systems together with the advantages derived from employing these air-conditioning systems as supply and return run-outs.

It will be understood that this invention is susceptible to modification in order to adapt it to different usages and conditions, and, accordingly, it is desired to comprehend such modification within this invention as may fall within the scope of the appended claims.

What is claimed is:

1. In combination, a blower-type air-conditioning unit for positioning along a wall of a room, said unit comprising a main heating and ventilating unit with an air inlet adjacent the bottom of the front wall thereof and air outlet means in the top wall thereof with a blower to blow air from said air inlet to said outlet, an elongated convector unit longer than said blower type unit extending laterally outwardly from each of the end walls of said main heating and ventilating unit and positioned on the face of the wall, the ends of said convector units being closed and there being openings in the top and bottom surfaces of said convector units, each of said convector units having a heat-radiating element therein, first conduit means connecting said convector heat-radiating elements in series to form with said heat-radiating elements a continuous supply path for a heating medium extending through said main and convector units, second conduit means extending through said main and convector units to form a continuous return path for a heating medium, said main heating and ventilating unit having a heat-radiating element therein which is connected across one of said conduit means and one of said convector heat-radiating elements, and supply and return connections extending from each end of both of said conduit means and projecting from the closed outer ends of said convector units for admitting and withdrawing the heating medium from said supply and return paths in said main and convector units.

2. In combination, a blower-type air-conditioning unit for positioning along a wall of a room, said unit comprising a main heating and ventilating unit with an air inlet adjacent the bottom of the front wall thereof and air outlet means in the top wall thereof with a blower to blow air from said air inlet to said outlet, an elongated convector unit longer than said blower-type unit extending laterally outwardly from each of the end walls of said main heating and ventilating unit and positioned on the face of the wall, the ends of said convector units being closed and there being openings in the top and bottom surfaces of said convector units, a first continuous conduit passing through said convector units and said main heating and ventilating unit, a second continuous conduit passing through said convector units and said main heating and ventilating unit, heat radiating fins on those portions of the second conduit passing through each of said convector units, a heat-radiating element in said main heating and ventilating unit and connected between said first and second conduits therein, the ends of said first and second conduits projecting outwardly of the closed ends of both of said convector units and having connecting means thereon.

References Cited in the file of this patent

UNITED STATES PATENTS

| | | |
|---|---|---|
| 1,301,589 | Nuckols | Apr. 22, 1919 |
| 1,326,277 | Latourelle | Dec. 30, 1919 |
| 1,883,896 | Garland | Oct. 25, 1932 |
| 1,991,990 | Van Vulpen et al. | Feb. 19, 1935 |
| 2,113,775 | Van Vulpen | Apr. 12, 1938 |
| 2,647,452 | Gillick et al. | Aug. 4, 1953 |
| 2,727,455 | Miller et al. | Dec. 20, 1955 |
| 2,775,432 | McElgin | Dec. 25, 1956 |